United States Patent [19]

Bevacqua

[11] 3,922,883
[45] Dec. 2, 1975

[54] ANTI-BACKLASH UNIVERSAL COUPLING
[75] Inventor: Louis Albert Bevacqua, Des Plaines, Ill.
[73] Assignee: Motorola, Inc., Chicago, Ill.
[22] Filed: Oct. 3, 1974
[21] Appl. No.: 511,838

[52] U.S. Cl. .............................. 64/7; 64/8; 403/383
[51] Int. Cl.² ............................................ F16D 3/02
[58] Field of Search ........ 64/7, 8, 6, 15 B; 403/383, 403/359

[56] References Cited
UNITED STATES PATENTS
| | | | |
|---|---|---|---|
| 2,595,936 | 5/1952 | Goode, Jr. | 64/8 |
| 2,912,837 | 11/1959 | Brodbeck | 64/7 |
| 3,098,365 | 7/1963 | Pearson | 64/7 |
| 3,406,534 | 10/1968 | Chapper | 64/8 |
| 3,609,994 | 10/1971 | Colletti et al. | 64/8 |

Primary Examiner—Samuel Scott
Assistant Examiner—Randall Heald
Attorney, Agent, or Firm—James W. Gillman; Donald J. Lisa

[57] ABSTRACT

A coupling device in which pins on the head of a male member engage slots in the cavity of a flexible female member. The pins are oversize relative to the slots creating an interference fit that minimizes backlash. A plurality of relief slots let the engaging slots breath to accommodate movement of the pins within the engaging slots with a minimum of drag. For high torque applications the female member may be reinforced with a steel compression spring.

8 Claims, 3 Drawing Figures

ANTI-BACKLASH UNIVERSAL COUPLING

BACKGROUND

Universal couplers are commonly used to solve a recurring mechanical problem. Basically, two members are to be joined such that rotation of one member about its axis will cause an equal rotation of the other member. However, the members must have angular freedom of movement relative to each other due to non-alignment of the drive and driven members, i.e. the angle formed by the longitudinal axis of the two members must be free to vary.

Ordinarily the coupling is comprised of two members. A male member is fixed to a female member in a manner suitable to achieve the required result.

Universal couplers have been made of many materials, e.g. metal, leather, rubber and plastic, and can be found in countless devices.

Auto radio receivers sold to OEM customers or sold in the aftermarket require a universal coupling at one or both controls due to non-alignment of the tuner mechanism and the tuner shaft. The angular drive is necessitated by a variety of reasons, such as, because of OEM styling requirements and because in aftermarket sales the radio must be adapted to fit the pre-made holes in the dashboard of all automobiles, said holes being spaced apart at dimensions varying from car to car.

A primary problem with universal couplers is "lost motion". Lost motion, also called backlash when it appears in a radio receiver tuning mechanism, occurs when rotation of the drive member does not create an equivalent rotation of the driven member. The result is that it becomes difficult to precisely tune the receiver to a particular station in the customary manner, namely, by moving the dial back and forth to either side of the station frequency until the maximum signal is received. Minimizing lost motion has required components of close tolerance usually made of metal, or additional components. Such solutions are costly. In addition, wear compensation has had to be incorporated such that a coupling did not develop lost motion with age.

One successful solution for the universal coupling problem present in radio receivers is shown in Race, U.S. Pat. No. 2,953,927, commonly owned with the present application, which uses a flexible cable coupling the tuner control with the tuner mechanism. Such solutions are costly at present day prices. A cheaper solution is needed.

Another successful solution for the anti-backlash universal coupling problem in radio receivers is shown in Brewster, U.S. Pat. No. 3,832,908, commonly owned with the present application, which uses a one piece plastic manual tuning shaft having an integrally formed universal joint section. However, such solution is limited where large angular drives are required to couple the tuner control to the tuner mechanism.

For more than a year prior to the filing date hereof, Motorola, Inc. has sold a radio receiver which uses a universal coupling similar to that shown in FIGS. 1, 2 and 3 in that it had a spherically shaped male head with two pins received in the slots of a cylindrically shaped female member. However, there was no interference fit between the pins and engaging slots, there were no relief slots, and there was no compression ring. Accordingly, the aforesaid coupling does not and cannot provide the unique advantages of applicant's coupling.

The present invention overcomes the disadvantages of the aforesaid prior art.

SUMMARY OF THE INVENTION

It is an object of this invention to provide an improved universal coupling with a minimum of lost motion which is adaptable to angular drives of approximately 45°.

A further object of this invention is to provide an improved universal coupling that has an interference fit between the coupling members and does not require close tolerances.

An additional object of this invention is to provide a universal coupling that is easy to make, reliable in use and inexpensive.

It is a further object of this invention to provide a universal coupling which has exceptional strength for use in high torque drives.

The present specification discloses a universal coupling having a male and female member. The male member has a head with pins extending from the head. The female member is provided with a cavity and two engaging slots such that when the male and female members are joined the head rests within the cavity and the pins ride in the slots, there being an interference between the pins and the slots. The female member is also provided with a plurality of circumferential relief slots extending a predetermined distance from the innermost extent of the engaging slots defining a flap portion which flexes to accommodate movement of the pins within the engaging slots with a minimum of drag. When one member is rotated about its axis, the coupled member will rotate about its axis an equivalent amount. A steel compression ring slips over the female member to reinforce the same for high torque applications.

DESCRIPTIONS OF THE DRAWINGS

For a more thorough understanding of the invention reference should be made to the drawing in which.

DETAILED DESCRIPTION OF THE PREFERRED EMBODIMENT OF THE INVENTION

Figure 1:
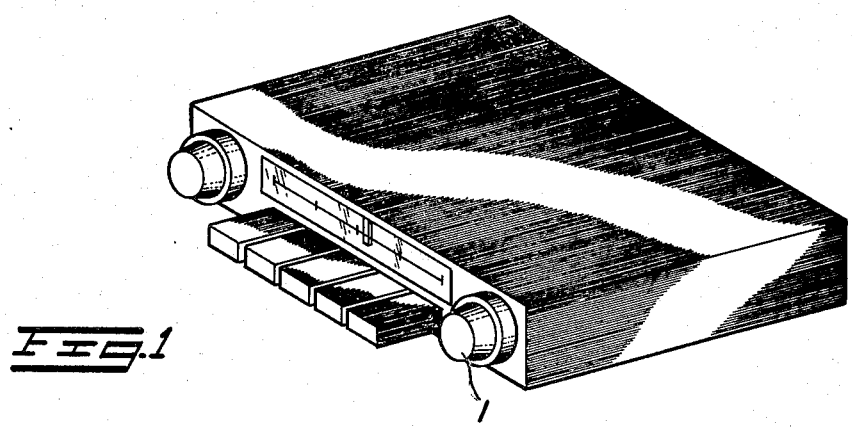
FIG. 1 is a radio receiver in which the tuner control uses the universal coupling of the present invention.
Figure 2:
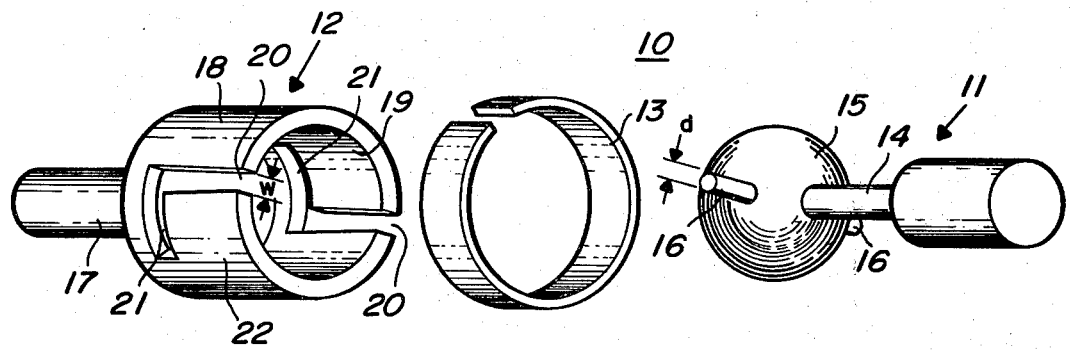
FIG. 2 is a diagram of male and female members with their corresponding parts, and the compression ring.
Figure 3:
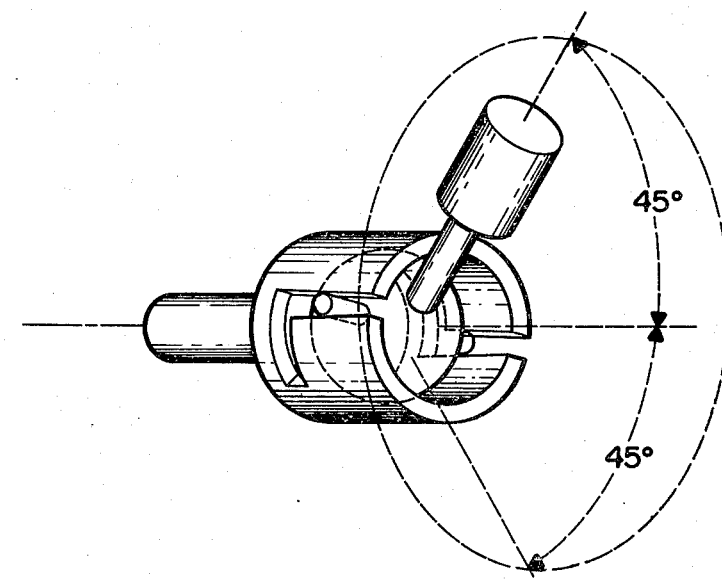
FIG. 3 is a perspective view of the combination universal coupling of the present invention showing an angular drive of approximately 45°.

FIG. 1 is a car radio receiver in which the tuner control 1 is attached to the universal coupling shown in FIGS. 2, 3. FIG. 2 shows a universal coupling 10 comprised of male member 11, female member 12 and supplement compression ring 13. The male member has drive shaft 14 attached to the tuning mechanism (not shown) of the radio receiver, spherical head 15 and engaging pins 16. The female member 12 is made of a flexible material and has shaft 17 attached to knob 1 of the radio receiver, cup 18 defining cavity 19, engaging slots 20 and reliefs 21.

The diameter d of the pins 16 is greater than width w of the slots 20 such that when head 15 is inserted in and substantially enclosed withing cavity 19 (FIG. 3), an interference fit is formed between the pins 16 and the slots 20. Reliefs 21 allow outward flexing of the female member 12 to accomodate oversize pins 16 of the male member 11.

The pins 16 are cylindrical in shape and extend along a common longitudinal axis, which axis includes the center of the spherical head, from opposite points on the head 15 a sufficient distance that each pin 16 is engagable within a slot 20 of female member 12. The longitudinal axis of the pins 16 is substantially perpendicular to the longitudinal axis of the shaft 14.

Cup 18 of female member 12 is a cylindrical housing having a longitudinal axis concurrent to the longitudinal axis of shaft 17. Cup 18 is provided with a cylindrical cavity 19 the diameter of which is predetermined so that there is a clearance between the surface of spherical head 15 and the diameter of cavity 19 when the head is inserted within the cavity. Also provided in female member 12 are axial engaging slots 20 which are formed in opposite sides within the cylindrical wall 18 and extend a predetermined distance from the mouth of cavity 19 parallel to the longitudinal axis of the shaft 17. Slots 20 and pins 16 are each sufficiently long such that when pins 16 are engaged therein, shaft 14 may sweep a substantial arc relative to shaft 17 without pins 16 disengaging from slots 20. See FIG. 3, where the angular drive between shafts 14 and 17 is approximately 45°.

Cup 18 is further provided with reliefs 21 which are circumferential slots each of which is formed in opposite sides of cup 18 and each of which extends from the inner extent of engaging slot 20 a short distance in a plane perpendicular to the longitudinal axis of the cup 18. The length of reliefs 21 are such that slots 20 and 21 define a flap 22 in the cylindrical surface of cup 18 of a size such that stress caused by the interference fit of oversize pins 16 in engaging slots 20 may produce an outward strain on the flap portions 22 of the cup 18 adjoining the slots 20, 21 which in turn increases width w of the engaging slots 20 without damage or permanent deformation to the cup 18. In other words, reliefs 21 let the slots "breath" to accommodate movement of the pins within the slots with a minimum of drag.

The interference fit between the pins 16 on the male member 11 and the slots 20 on the female member 12 causes the two members to rotate about their longitudinal axis without backlash when one member is driven. The angle formed by the intersection of the longitudinal axis of the two members may vary.

The steel compression ring 13 functions as a stiffener for the flaps 22 of cup 18 for situations where the shaft 14 is hard to turn and the natural resistance to flexing of the plastic flaps 22 may be inadequate. With ring 13 in place, large rotational forces may be applied to pins 16 without causing flaps 22 of cup 18 to spread apart at the slots 20.

The male and female members 11, 12 are preferably made of plastic, such as DELRIN. The supplement compression ring 13 is also preferably made from standard steel spring stock.

Accordingly, the universal coupling shown in FIGS. 1 to 3 due to the interference fit has no backlash, is adapted for angular drives of approximately 45°, is simple and inexpensive to make, and with the compression ring, can meet high torque demands.

While the invention has been described in terms of a preferred embodiment thereof, it should be clear that many variations could be made thereto which would not depart from the spirit and scope of the invention.

I claim:
1. A universal coupling having
   a male member,
   a female member,
   the male member having a head with a plurality of pins extending therefrom,
   and the female member provided with a cavity and engaging slots,
   each pin being received within a respective one of the slots,
   the head being substantially enclosed within the cavity,
   wherein the improvement comprises
   the pins being oversize relative to the slots to provide an interference fit therebetween,
   the female member being provided with a plurality of relief slots such that the portions of the female member adjoining the engaging slots can independently flex upon engagement of the pins within the slots, and
   the relief slots being circumferential slots formed in a plane perpendicular to the longitudinal axis of the cavity and extending a predetermined distance from the innermost extent of the engaging slots,
   whereby the members are substantially constrained to move about their longitudinal axis in unison but are substantially free to move angularly relative to each other.

2. A universal coupling as defined in claim 1 wherein the head is spherical in shape.

3. A universal coupling as defined in claim 2 wherein the female member is provided with a cavity that is cylindrical in shape.

4. A universal coupling as defined in claim 3 wherein the pins are positioned substantially opposite on the head about a common longitudinal axis formed substantially opposed on the male member.

5. A universal coupling as defined in claim 4 wherein the female member is comprised of a flexible material such that the female member can better conform to the male member.

6. A universal coupling comprising
   a male member having a shaft,
   a female member having a shaft,
   the male member having a spherical head,
   the spherical head having a plurality of pins,
   the pins cylindrical in shape extending along a common longitudinal axis from opposite points on the head,
   the female member being formed as a cylindrical cup,
   the cup composed of flexible material and having its longitudinal axis substantially concurrent with the axis of the female shaft,
   the cup provided with a cylindrical cavity therein
   the cup provided with axial engaging slots,
   the slots extending a predetermined distance from the mouth of the cavity on opposite sides of the cup,
   the pins being oversize with respect to the slots,
   each pin being received within a respective one of the slots, and having an interference fit therewith,
   the cup being provided with relief slots, and
   the relief slots being circumferential to the cup and extending from the inner extent of the engaging slots a short distance in a plane perpendicular to the longitudinal axis of the cup the head being substantially enclosed within the cavity,
whereby the members are substantially constrained to move about their longitudinal axis in unison but are substantially free to angularly move one to the other.

7. The universal coupling as defined in claim 6 wherein a compression ring is slipped over the female member such that bias of the ring reinforces the female member.

8. In a radio receiver having
a tuning mechanism,
a tuning control, and
a universal coupling having
a male member having a shaft,
a female member having a shaft,
one of said shafts being coupled to the tuning mechanism and the other of said shafts being coupled to the tuning control
wherein the improvement comprises:
the male member having a spherical head,
the spherical head having a plurality of pins,
the pins extending along a common longitudinal axis from opposite points on the head,
the female member being formed as a cup,
of a flexible material and having its longitudinal axis substantially concurrent with the axis of the female shaft,
with a central cavity therein and
with axial engaging slots,
the slots extending a predetermined distance from the mouth of the cavity on opposite sides of the cup,
the pins being oversize with respect to the slots,
each pin being received within a respective one of the slots and having an interference fit therewith,
the cup being provided with relief slots, and
the relief slots being circumferential to the cup and extending from the inner extent of the engaging slots a predetermined distance,
the head being substantially enclosed within the cavity,
whereby the shafts are substantially constrained to move about their longitudinal axis in unison for tuning said receiver.

* * * * *